United States Patent
Chim et al.

(10) Patent No.: US 10,474,450 B1
(45) Date of Patent: Nov. 12, 2019

(54) SYSTEM AND METHOD TO TRANSMIT QUEUED OVER-THE-AIR SOFTWARE UPDATES

(71) Applicant: GM GLOBAL TECHNOLOGY OPERATIONS LLC, Detroit, MI (US)

(72) Inventors: Huong T. Chim, Royal Oak, MI (US); Esteban Camacho, Belleville, MI (US); Dexter C. Lowe, Macomb, MI (US); James Doherty, Wyandotte, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/984,811

(22) Filed: May 21, 2018

(51) Int. Cl.
| | |
|---|---|
| *G06F 8/65* | (2018.01) |
| *H04L 29/08* | (2006.01) |
| *H04W 4/44* | (2018.01) |
| *H04W 4/14* | (2009.01) |
| *H04W 84/12* | (2009.01) |

(52) U.S. Cl.
CPC ............. *G06F 8/65* (2013.01); *H04L 67/12* (2013.01); *H04L 67/34* (2013.01); *H04W 4/14* (2013.01); *H04W 4/44* (2018.02); *H04W 84/12* (2013.01)

(58) Field of Classification Search
CPC .. G06F 8/65; H04W 4/44; H04W 4/14; H04L 67/12; H04L 67/34; H06W 4/14
USPC .............................................. 717/173
See application file for complete search history.

(56) References Cited

U.S. PATENT DOCUMENTS

| | | | | |
|---|---|---|---|---|
| 5,974,454 | A * | 10/1999 | Apfel | G06F 8/65 709/218 |
| 2004/0214599 | A1* | 10/2004 | Ogino | G06F 8/61 455/556.1 |
| 2006/0161550 | A1* | 7/2006 | Carini | G06Q 30/02 |
| 2009/0300595 | A1* | 12/2009 | Moran | G06F 8/65 717/170 |
| 2018/0159824 | A1* | 6/2018 | Youtz | H04L 61/3075 |
| 2018/0217828 | A1* | 8/2018 | Madrid | G06F 21/57 |

* cited by examiner

*Primary Examiner* — Todd Aguilera
*Assistant Examiner* — Sen Thong Chen (57) ABSTRACT

One general aspect includes a method to transmit one or more over-the-air software updates, the method including: (a) receiving, via a controller, a software update; (b) receiving, via a controller, a vehicle command request; (c) in response to the vehicle command request, via the controller, generating a communication package including update callback information based on the software update and a vehicle command based on the vehicle command request; and (d) transmitting, via the controller, the communication package to a vehicle. Other embodiments of this aspect include corresponding computer systems, apparatus, and computer programs recorded on one or more computer storage devices, each configured to perform the actions of the methods.

17 Claims, 2 Drawing Sheets

SYSTEM AND METHOD TO TRANSMIT QUEUED OVER-THE-AIR SOFTWARE UPDATES

INTRODUCTION

Vehicle communications are generally sent from the backend as Short Messaging Service (SMS)-based Over-The-Air (OTA) notifications. Each of these notifications also comes with transactional costs. As a result, with the number of vehicle interactions increasing on a daily basis, the cost of vehicle connectivity is rapidly rising. However, if it is possible to reduce the number vehicle interactions while still conveying all necessary information, vehicle connectivity costs can be reduced without resulting in data loss. It is therefore desirable to provide a system and method that will hold onto non-urgent vehicle communications until they can be transmitted with other higher priority vehicle communications because this system and method can reduce the number of vehicle interactions and thus can reduce vehicle connectivity costs.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method to transmit one or more over-the-air software updates, the method including: (a) receiving, via a controller, a software update; (b) receiving, via a controller, a vehicle command request; (c) in response to the vehicle command request, via the controller, generating a communication package including update callback information based on the software update and a vehicle command based on the vehicle command request; and (d) transmitting, via the controller, the communication package to a vehicle. Other embodiments of this aspect include corresponding computer systems, apparatus, and computer programs recorded on one or more computer storage devices, each configured to perform the actions of the methods.

Implementations may include one or more of the following features. The method further including: (e) after step (a), communicating with the vehicle, via the controller, to determine whether the software update is capable of being installed by the vehicle; and generating the communication package of step (c) when it is determined that the vehicle is capable of installing the software update; otherwise, generating a communication package in step (c) that excludes the update callback information. The method where the update callback information instructs the vehicle to retrieve the software update from the controller. The method where the vehicle command is a remote start command, vehicle diagnostics update command, location update command, or some combination thereof. The method where the communication package is sent to the vehicle as an SMS-based OTA notification. The method where the software update is placed in a queue after step (a) is carried out and the software update is stored in a memory until after step (d) is carried out. The method where the vehicle command request is received, at the controller, from a mobile computing device via a wireless carrier system. Implementations of the described techniques may include hardware, a method or process, or computer software on a computer-accessible medium.

One general aspect includes a system to transmit one or more over-the-air software updates, the system including: a memory configured to include one or more executable instructions and a controller configured to execute the executable instructions, where the executable instructions enable the controller to: receive a software update; receive a vehicle command request; in response to the vehicle command request, generate a communication package including update callback information based on the software update and a vehicle command based on the vehicle command request; and transmit the communication package to a vehicle. Other embodiments of this aspect include corresponding computer systems, apparatus, and computer programs recorded on one or more computer storage devices, each configured to perform the actions of the methods.

Implementations may include one or more of the following features. The system further including: after the software update has been received, communicate with the vehicle to determine whether the software update is capable of being installed by the vehicle. The system may also include generate the communication package to include the update callback information and the vehicle command only when it is determined that the vehicle is capable of installing the software update; otherwise, generate a communication package that excludes the update callback information. The system where the update callback information instructs the vehicle to retrieve the software update from the controller. The system where the vehicle command is a remote start command, vehicle diagnostics update command, location update command, or some combination thereof. The system where the communication package is sent to the vehicle as an SMS-based OTA notification. The system where: the software update is placed in a queue after being received; and the software update is stored in the memory until after the communication package is transmitted. The system where the vehicle command request is received from a mobile computing device via a wireless carrier system. Implementations of the described techniques may include hardware, a method or process, or computer software on a computer-accessible medium.

One general aspect includes a non-transitory and machine-readable medium having stored thereon executable instructions adapted to transmit one or more over-the-air software updates, which when provided to a controller and executed thereby, causes the controller to: receive a software update; receive a vehicle command request; in response to the vehicle command request, generate a communication package including update callback information based on the software update and a vehicle command based on the vehicle command request; and transmit the communication package to a vehicle. Other embodiments of this aspect include corresponding computer systems, apparatus, and computer programs recorded on one or more computer storage devices, each configured to perform the actions of the methods.

Implementations may include one or more of the following features. The non-transitory and machine-readable memory further including: after the software update has been received, communicate with the vehicle to determine whether the software update is capable of being installed by the vehicle; and generate the communication package to include the update callback information and the vehicle command when it is determined that the vehicle is capable of installing the software update; otherwise, generate a communication package that excludes the update callback information. The non-transitory and machine-readable memory where the update callback information instructs the vehicle to retrieve the software update from the controller. The non-transitory and machine-readable memory where the communication package is sent to the vehicle as an SMS-based OTA notification. The non-transitory and machine-readable memory where: the software update is placed in a queue after being received; and the software update stored in the non-transitory and machine-readable medium until after the communication package is transmitted. The non-transitory and machine-readable memory where the vehicle command request is received from a mobile computing device via a wireless carrier system. Implementations of the described techniques may include hardware, a method or process, or computer software on a computer-accessible medium.

The above features and advantages and other features and advantages of the present teachings are readily apparent from the following detailed description for carrying out the teachings when taken in connection with the accompanying drawings.

BRIEF DESCRIPTION OF THE DRAWINGS

The disclosed examples will hereinafter be described in conjunction with the following drawing figures, wherein like numerals denote like elements, and wherein.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present system and/or method. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
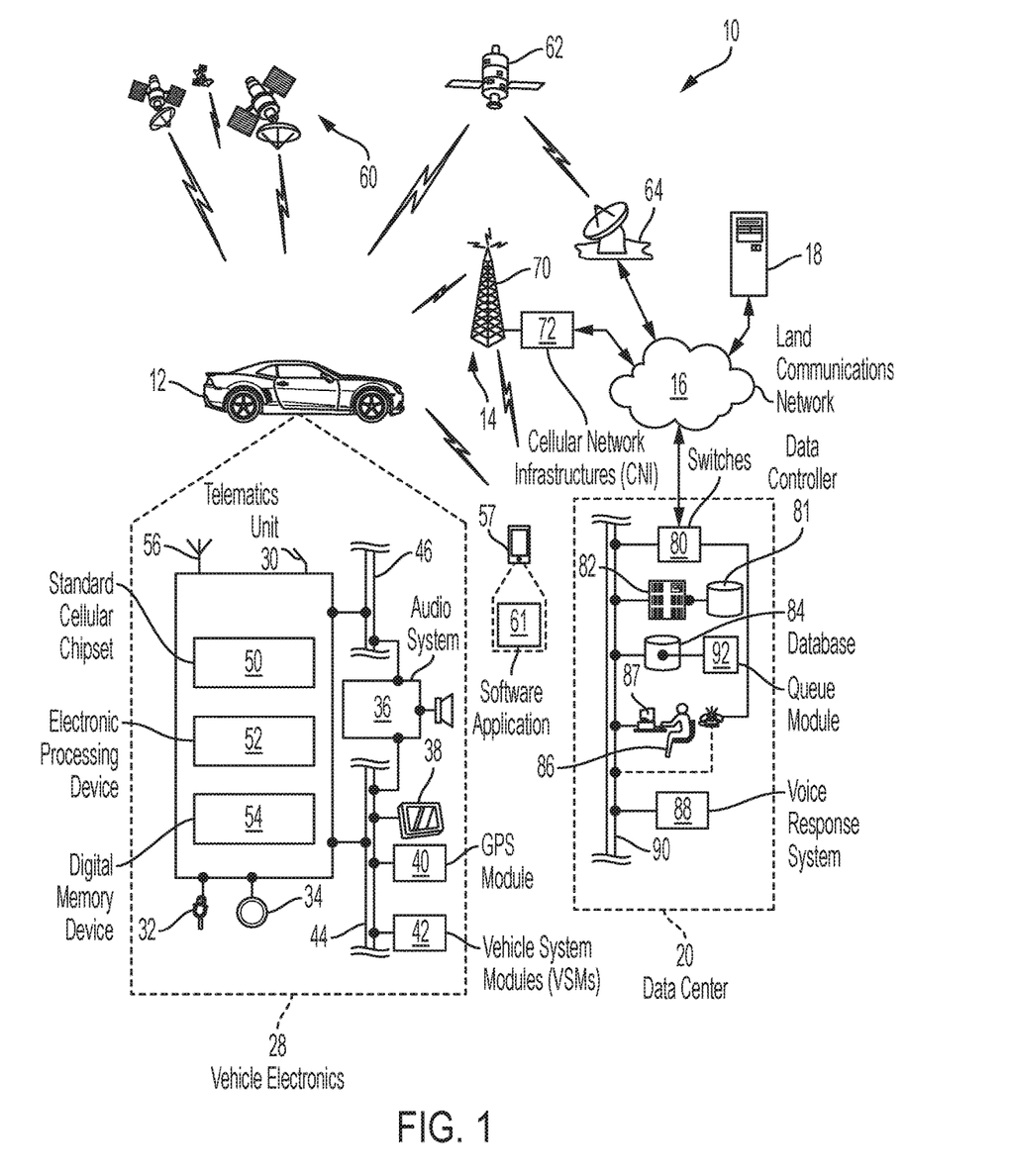
FIG. 1 is a block diagram depicting an exemplary embodiment of a communications system that is capable of utilizing the system and method disclosed herein.

With reference to FIG. 1, there is shown an operating environment that includes, among other features, a mobile vehicle communications system 10 and that can be used to implement the method disclosed herein. Communications system 10 generally includes a vehicle 12, one or more wireless carrier systems 14, a land communications network 16, a computer 18, and a data center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including, but not limited to, motorcycles, trucks, busses, sports utility vehicles (SUVs), recreational vehicles (RVs), construction vehicles (e.g., bulldozers), trains, trolleys, marine vessels (e.g., boats), aircraft, helicopters, amusement park vehicles, farm equipment, golf carts, trams, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit 30 such as, for example, the microphone 32 and pushbutton(s) 34, whereas others are indirectly connected using one or more network connections, such as a communications bus 44 or an entertainment bus 46. Examples of suitable network connections include a controller area network (CAN), WIFI, Bluetooth and Bluetooth Low Energy, a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket transceiver device that is installed in the vehicle and that enables wireless voice and/or data communication over wireless carrier system 14 and via wireless networking. This enables the vehicle to communicate with data center 20, other telematics-enabled vehicles, or some other entity or device. The telematics unit 30 preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via package data transmission over a data channel, or via a voice channel using techniques known in the art. For combined services that involve both voice communication (e.g., with a live advisor 86 or voice response unit at the data center 20) and data communication (e.g., to provide GPS location data or vehicle diagnostic data to the data center 20), the system can utilize a single call over a voice channel and switch as needed between voice and data transmission over the voice channel, and this can be done using techniques known to those skilled in the art.

According to one embodiment, telematics unit 30 utilizes cellular communication according to standards such as LTE or 5G and thus includes a standard cellular chipset 50 for voice communications like hands-free calling, a wireless modem for data transmission (i.e., transceiver), an electronic processing device 52, at least one digital memory device 54, and an antenna system 56. It should be appreciated that the modem can either be implemented through software that is stored in the telematics unit and is executed by processor 52, or it can be a separate hardware component located internal or external to telematics unit 30. The modem can operate using any number of different standards or protocols such as, but not limited to, WCDMA, LTE, and 5G. Wireless networking between vehicle 12 and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for package-switched data communication such as TCP/IP, the telematics unit can be configured with a static IP address or can set up to automatically receive an assigned IP address from another device on the network such as a router or from a network address server.

One of the networked devices that can communicate with the telematics unit 30 is a mobile computing device 57, such as, but not limited to, a smart phone, personal laptop computer, smart wearable device, netbook computer, or tablet computer having two-way communication capabilities. The mobile computing device 57 can include computer processing capability and memory (not shown), a transceiver capable of communicating with wireless carrier system 14, and/or a GPS module capable of receiving GPS satellite signals and generating GPS coordinates based on those signals. Examples of the mobile computing device 57 include the iPhone™ manufactured by Apple, Inc. and the Pixel™ manufactured by HTC, Inc. as well as others.

The mobile computing device 57 additionally has a vehicle-related software application 61 (e.g., RemoteLink™ by OnStar, myChevrolet™ by General Motors, etc.) resident on its memory. This vehicle app may be downloaded (e.g., from an online application store or marketplace) and stored on the device's electronic memory. When the vehicle app 61 is installed, in one or more embodiments, the vehicle app 61 enables the mobile computing device user to manage and send one or more remote command requests (e.g., remote start request, delayed remote start request, vehicle diagnostics update request, location update request, etc.) from mobile computing device 57. This request information may also be transmitted via wireless carrier system 14 to data center 20 for processing and subsequent generation of one or more vehicle commands (e.g., remote start, vehicle diagnostics update, location update, etc.).

Telematics Controller 52 (processor) can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Telematics Controller 52 executes various types of digitally-stored and updatable instructions, such as software or firmware programs stored in memory 54, which enable the telematics unit to provide a wide variety of services. For instance, controller 52 can execute programs or process data to carry out at least a part of the system and/or method discussed herein.

Telematics unit 30 can be used to provide a diverse range of vehicle services that involve wireless over-the-are messaging/communication to and/or from the vehicle. Such services include: over-the-air software updates, turn-by-turn directions and other navigation-related services that are provided in conjunction with the GPS-based vehicle navigation module 40; airbag deployment notification and other emergency or roadside assistance-related services provided in connection with one or more vehicle system modules 42 (VSM); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit 30 is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to data center 20 or other remote computer system, such as computer 18, for other purposes, such as fleet management. Also, new or updated map data can be downloaded to the GPS module 40 from the data center 20 via the telematics unit 30.

Apart from the audio system 36 and GPS module 40, the vehicle 12 can include other VSMs 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests.

As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art.

The pushbutton(s) 34 allow manual user input into the telematics unit 30 to initiate wireless telephone calls and provide other data, response, or control input. Separate pushbuttons can be used for initiating emergency calls versus regular service assistance calls to the data center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM, media streaming services (e.g., PANDORA RADIO™, SPOTIFY™, etc.), satellite radio, CD, DVD, and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions (i.e., capable of GUI implementation). Audio system 36 may also generate at least one audio notification to announce such third-party contact information is being exhibited on display 38 and/or may generate an audio notification which independently announces the third-party contact information. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more cellular network infrastructures (CNI) 72, as well as any other networking components required to connect wireless carrier system 14 with land network 16. Each cell tower 70 includes sending and receiving antennas and a base station, with the base stations from different cell towers being connected to the CNI 72 either directly or via intermediary equipment such as a base station controller. Cellular system 14 can implement any suitable communications technology, including for example, analog technologies such as AMPS, or the newer digital technologies such as, but not limited to, 4G LTE and 5G. As will be appreciated by skilled artisans, various cell tower/base station/CNI arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to data center 20. For example, land network 16 may include a public switched telephone network (PSTN) such as that used to provide hardwired telephony, package-switched data communications, and the Internet infrastructure (i.e., a network of interconnected computing device nodes). One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, data center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer (e.g., a SIP Presence server) where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or data center 20, or both. A computer 18 can also be used for providing Internet connectivity such as DNS services or as a network address server that uses DHCP or other suitable protocol to assign an IP address to the vehicle 12.

Data center 20 is designed to provide the vehicle electronics 28 with a number of different system backend functions (e.g., sending over-the-are software updates) and, according to the exemplary embodiment shown here, generally includes one or more switches 80, servers 82, database 84, live advisors 86, as well as an automated voice response system (VRS) 88, all of which are known in the art. These various data center components are preferably coupled to one another via a wired or wireless local area network 90. Switch 80, which can be a private branch exchange (PBX) switch, routes incoming signals so that voice transmissions are usually sent to either the live advisor 86 by regular phone, backend computer 87, or to the automated voice response system 88 using VoIP. Server 82 can incorporate a data controller 81 which essentially controls the operations of server 82. Server 82 may control data information as well as act as a transceiver to send and/or receive the data information (i.e., data transmissions) from one or more of the database 84, telematics unit 30, and mobile computing device 57.

Controller 81 is capable of reading executable instructions stored in a non-transitory machine readable medium and may include one or more from among a processor, a microprocessor, a central processing unit (CPU), a graphics processor, Application Specific Integrated Circuits (ASICs), Field-Programmable Gate Arrays (FPGAs), state machines, and a combination of hardware, software and firmware components. The live advisor phone can also use VoIP as indicated by the broken line in FIG. 1. VoIP and other data communication through the switch 80 is implemented via a modem (i.e., a transceiver), connected between the land communications network 16 and local area network 90.

Data transmissions are passed via the modem to server 82 and/or database 84. Database 84 can store account information such as vehicle dynamics information and other pertinent subscriber information. Data transmissions may also be conducted by wireless systems, such as 802.11x, GPRS, and the like. Although the illustrated embodiment has been described as it would be used in conjunction with a manned data center 20 using live advisor 86, it will be appreciated that the data center can instead utilize VRS 88 as an automated advisor or, a combination of VRS 88 and the live advisor 86 can be used.

Database 84 could also be designed to store information in the form of executable instructions such as, but not limited to, numerous application program interface (API) suites accessed, executed, and/or governed by server 82. Moreover, in certain embodiments, these API suites may be accessible to the system user, data center 20, or one or more third parties. As examples, one API suite can be a software update queue module 92 (queue module). Queue module 92 can receive a vehicle software update that may be considered to be non-urgent (e.g., a release update package, infotainment display configuration updates, prepaid wireless communications credits). Queue module 92 can then place the update in a queue and then at least temporarily store the update in database 84 until data center 20 has received a vehicle command request which corresponds with the update's queue number (e.g., remote start request, delayed remote start request, vehicle diagnostics update request, location update request, etc.). Upon receipt of the command, queue module 92 will provide the software update to server 82 so that the server can generate update callback information based on the software update (i.e., instructions for telematics unit 30 to responsively call server 82 to download the software update). Alternatively, in one or more embodiments, queue module 92 itself may generate the update callback information based on the software update and provide that information to server 82.

Method

Figure 2:
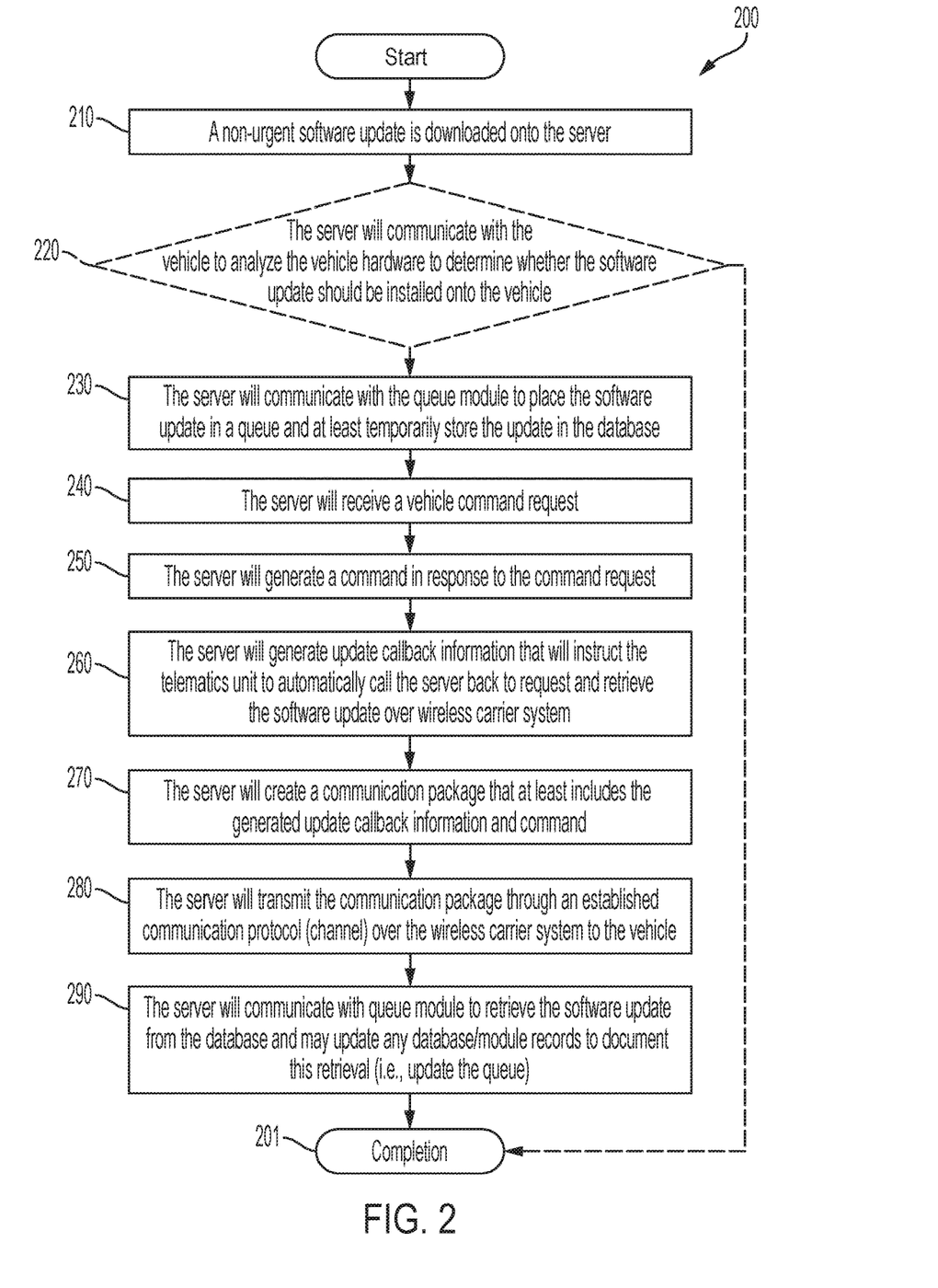
FIG. 2 is a flow chart for an exemplary methodology to transmit one or more queued over-the-air software updates.

Now turning to FIG. 2, there is shown an embodiment of a method 200 to transmit one or more queued OTA software updates. One or more aspects of transmission method 200 may be completed through queue module 92 being implemented by server 82 of data center 20 which may include one or more executable instructions incorporated into database 81. One or more aspects of method 200 may otherwise, for example, be completed through vehicle telematics unit 30 and mobile computing device 57. Skilled artisans will moreover see that telematics unit 30, data center 20, and mobile computing device 57 may be remotely located from each other.

Method 200 is supported by telematics unit 30 being configured to establish one or more communication protocols with data center 20. This configuration may be established by a vehicle manufacturer at or around the time of the telematics unit's assembly or after-market (e.g., via vehicle download using the afore-described communication system 10 or at a time of vehicle service, just to name a couple of examples). In at least one implementation, one or more instructions are provided to the telematics unit 30 and stored on non-transitory computer-readable medium (e.g., memory device 54). Method 200 is further supported by preconfiguring data center 20 to store queue module 92 as well as one or more other APIs in database 84, each of which being operatively accessible via server 82. Method 200 is further yet supported by preconfiguring mobile computing device 57 to produce one or more vehicle command requests as well as store one or more software applications in its electronic memory.

Method 200 begins at step 210 in which a non-urgent software update is downloaded onto server 82 (to be stored on database 84). The software update can be, for example, new vehicle software or a newer version of preexisting vehicle software such as, for example, a software upgrade, patches, or bug fixes or the OTA software update can be, for example, updated configuration settings for preexisting vehicle software. Moreover, the OTA software update can be transmitted to the telematics unit 30 through a communication protocol over wireless carrier system 14 (i.e., an over-the-air or OTA software update). In addition, software updates are considered non-urgent when they can be downloaded and installed on telematics unit 30 or some other vehicle system at some amount of time after the update has been downloaded to server 82 because the update does not substantially affect vehicle performance or passenger safety. For example, radio preset settings updates for the infotainment operating system of telematics unit 30 or prepaid wireless communications credits can be installed by vehicle 12 hours to days after being downloaded onto server 82 because delayed installation of these features would not cause vehicle operation errors (e.g., braking issues, telematics unit services outages/glitches, etc.) nor should delayed installation place vehicle passengers in danger. In one or more embodiments, when being downloaded to server 82, the software update can be submitted to an external retry request manager (ERRM) API installed on database 84.

In optional step 220, server 82 will communicate with vehicle 12 to analyze the vehicle hardware to determine whether the software update should be installed onto the vehicle 12. For example, server 82 can access a vehicle communication system (VCS) API to communicate with telematics unit 30 via an established communication protocol so as to analyze whether telematics unit 30 has an operating system which is configured to receive the specific software upgrade included in the software update. If server 82 determines that the software update is one that is capable of being downloaded by telematics unit 30, method 200 will move to step 230; otherwise, method 200 will move to completion 201 (e.g., when the software upgrade is designed for an infotainment operating system not installed onto telematics unit 30).

In step 230, server 82 will communicate with queue module 92 to place the software update in a queue and at least temporarily store the update in database 84 (i.e., the software update will remain in storage until its queue number is called). The queue may moreover be configured to be a first-in-first-out system. In step 240, server 82 will receive a vehicle command request, which may be associated with the update's queue number. Moreover, this command request may be received after a substantial duration of time from when queue module 92 initially stored the software update in database 84 (e.g., six hours, two days, etc.) as well as after other requests associated with other queue numbers have been received.

As discussed above, this vehicle command request may be generated and wirelessly transmitted from mobile computing device 57 by a user activating and operating their remote start vehicle app (e.g., RemoteLink™ by OnStar, myChevrolet™ by General Motors, etc.). Moreover, the vehicle command request may be one of a number of generally known requests such as, for example, a remote start request, delayed remote start request, vehicle diagnostics update request, or location update request. As follows, a remote start request will request server 82 to generate a vehicle command that will start engine operations and/or one or more vehicle systems of vehicle 12. A delayed remote start request will request server 82 to generate a vehicle command that will start the engine and/or one or more vehicle systems at some point in time after the request is received (e.g., two (2) hours). A vehicle diagnostic update request will request server 82 to generate a vehicle command that will cause the vehicle to produce and transmit diagnostics information for one or more vehicle systems and/or VSMs 42. This diagnostics information can, moreover, be sent to mobile computing device 57 for display purposes. A location update request will request server 82 to generate a vehicle command that will cause the vehicle to produce and transmit current location information (e.g., GPS location information), which can also be sent to mobile computing device 57 for display purposes.

In step 250, server 82 will generate a command in response to the command request (i.e., a trigger event). For example, server 82 may generate a remote start command, vehicle diagnostics update command, location update command (explained above). This command may moreover be in binary form and be a sequence of integers which are recognizable by telematics unit 30 (i.e., a message containing numbers and letters). As follows, when received by telematics unit 30, processor 52 should analyze the command message and should subsequently retrieve executable instructions from digital memory device 54 to cause processor 52 to carry out the command.

In step 260, server 82 will generate update callback information that, when received by telematics unit 30, will instruct the telematics unit 30 to automatically call server 82 back to request and retrieve the software update over wireless carrier system 14. Similar to the command, this callback information may moreover be in binary form and be a sequence of integers which are recognizable by telematics unit 30. In one or more embodiments, in this step, server 82 may communicate with queue module 92 to have the module generate this callback information or to simply retrieve callback information previously generated by queue module 92 at the time it first queued the software update. In one or more embodiments, queue module 92 may enable exclusive types of vehicle command requests to count as trigger events for the queue. For example, remote start requests and delayed remote start requests may only count to cause server 82 to generate the update callback information.

In step 270, server 82 will create a communication package that at least includes the generated update callback information and command. The communication package may be embodied as a Short Messaging Service (SMS)-based Over-The-Air (OTA) notification that includes both the command and update callback information messages as well as instructions to execute the command before executing any action associated with the update callback information. Moreover, the messages in the communication package or the communication package itself may be encrypted. It should be understood that, at the very least, this communication package is an innovative arrangement of at least the update callback information and command features. The communication package also improves the ability of server 82 to communicate with vehicle 12 because this package reduces the number of interactions required to convey certain information and thus can reduce connectivity failure rates, data transmission speed, and efficiency because the lines of communication between server 82 and vehicle 12 will more likely be open for reception at the time of transmission. In addition, since each SMS-based OTA notification comes with a per-transaction charge, implementing the communication package into system 10 can reduce the overall costs for vehicle communications due to there being a reduction in the number of SMS-based OTA notifications needing to be sent to vehicle 12.

In step 280, server 82 will transmit the communication package through an established communication protocol (channel) over wireless carrier system 14 to vehicle 12. Upon receipt of the command package, this communication protocol will end and telematics unit 30 will analyze both the command message and update callback information message and subsequently retrieve corresponding executable instructions from digital memory device 54. The executable instructions will then cause processor 52 to carryout the command (e.g., starting the vehicle) and then collaborate with antenna system 56 to establish its own independent communication protocol with server 82 over wireless carrier system 14. Moreover, after this separate call back communication protocol has been established, processor 52 will request server 82 provide the status update for downloading via the protocol. Furthermore, upon requesting server 82 provide the update, a handshake technique may be carried out between server 82 and telematics unit 30 to verify the request as being authentic. It should be understood that the communication protocol can be encrypted.

In step 290, server 82 will communicate with queue module 92 to retrieve the software update from database 84 and may update any database/module records to document this retrieval (i.e., update the queue). Once the software update has been retrieved from queue module 92, server 82 will make the software update available for telematics unit 30 to download via the communication protocol. Telematics unit 30 will then retrieve, download, and install the software update. After step 290, method 200 will move to completion 201.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the system and/or method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for," or in the case of a method claim using the phrases "operation for" or "step for" in the claim.

What is claimed is:

1. A method to transmit one or more over-the-air software updates, the method comprising:
   (a) receiving, via a controller, a software update;
   (b) placing, via the controller, the software update in a queue, wherein the queue is a first-in-first-out system that provides the software update with a queue number and stores the software update in a database until the queue number is called;
   (c) receiving, via the controller, a vehicle command request;
   (d) associating, via the controller, the vehicle command request with the queue number of the software update;
   (e) after the vehicle command request has been associated with the queue number, via the controller, retrieving the software update from the database;
   (f) after the software update is retrieved from the database, via the controller, generating update callback information based on the software update;
   (g) generating, via the controller, a vehicle command based on the vehicle command request;
   (h) in response to the vehicle command request, via the controller, generating a communication package configured to reduce a number of interactions required to convey information to a vehicle, the communication package being an arrangement of both the update callback information and the vehicle command; and
   (i) transmitting, via the controller, the communication package to the vehicle.

2. The method of claim 1, further comprising:
   (j) after step (a), communicating with the vehicle, via the controller, to determine whether the software update is capable of being installed by the vehicle; and generating the communication package of step (h) after it is determined that the vehicle is capable of installing the software update.

3. The method of claim 1, wherein the update callback information instructs the vehicle to retrieve the software update from the controller.

4. The method of claim 1, wherein the vehicle command is a remote start command, vehicle diagnostics update command, location update command, or some combination thereof.

5. The method of claim 1, wherein the communication package is sent to the vehicle as an SMS-based OTA notification.

6. The method of claim 1, wherein the vehicle command request is received, at the controller, from a mobile computing device via a wireless carrier system.

7. A system to transmit one or more over-the-air software updates, the system comprising:
   a memory configured to comprise one or more executable instructions and a controller configured to execute the executable instructions, wherein the executable instructions enable the controller to:
   receive a software update;
   place the software update in a queue, wherein the queue is a first-in-first-out system that provides the software update with a queue number and stores the software update in a database until the queue number is called;
   receive a vehicle command request;
   associate the vehicle command request with the queue number of the software update;
   after the vehicle command request has been associated with the queue number, retrieve the software update from the database;
   after the software update is retrieved from the database, generate update callback information based on the software update;
   generate a vehicle command based on the vehicle command request;
   in response to the vehicle command request, generate a communication package configured to reduce a number of interactions required to convey information to a vehicle, the communication package being an arrangement of both the comprising update callback information and the vehicle command; and
   transmit the communication package to the vehicle.

8. The system of claim 7, further comprising:
   after the software update has been received, communicate with the vehicle to determine whether the software update is capable of being installed by the vehicle; and
   generate the communication package after it is determined that the vehicle is capable of installing the software update.

9. The system of claim 7, wherein the update callback information instructs the vehicle to retrieve the software update from the controller.

10. The system of claim 7, wherein the vehicle command is a remote start command, vehicle diagnostics update command, location update command, or some combination thereof.

11. The system of claim 7, wherein the communication package is sent to the vehicle as an SMS-based OTA notification.

12. The system of claim 7, wherein the vehicle command request is received from a mobile computing device via a wireless carrier system.

13. A non-transitory and machine-readable medium having stored thereon executable instructions adapted to transmit one or more over-the-air software updates, which when provided to a controller and executed thereby, causes the controller to:
　receive a software update;
　　place the software update in a queue, wherein the queue is a first-in-first-out system that provides the software update with a queue number and stores the software update in a database until the queue number is called;
　　receive a vehicle command request;
　　associate the vehicle command request with the queue number of the software update;
　　after the vehicle command request has been associated with the queue number, retrieve the software update from the database;
　　after the software update is retrieved from the database, generate update callback information based on the software update;
　　generate a vehicle command based on the vehicle command request;
　　in response to the vehicle command request, generate a communication package configured to reduce a number of interactions required to convey information to a vehicle, the communication package being an arrangement of both the update callback information and the vehicle command; and
　　transmit the communication package to the vehicle.

14. The non-transitory and machine-readable memory of claim 13, further comprising:
　after the software update has been received, communicate with the vehicle to determine whether the software update is capable of being installed by the vehicle; and
　generate the communication package after it is determined that the vehicle is capable of installing the software update.

15. The non-transitory and machine-readable memory of claim 13, wherein the update callback information instructs the vehicle to retrieve the software update from the controller.

16. The non-transitory and machine-readable memory of claim 13, wherein the communication package is sent to the vehicle as an SMS-based OTA notification.

17. The non-transitory and machine-readable memory of claim 13, wherein the vehicle command request is received from a mobile computing device via a wireless carrier system.

\* \* \* \* \*